June 12, 1962 — R. UNTERBERGER — 3,038,659
RAPID-ACTION COUNTER
Filed Dec. 26, 1958
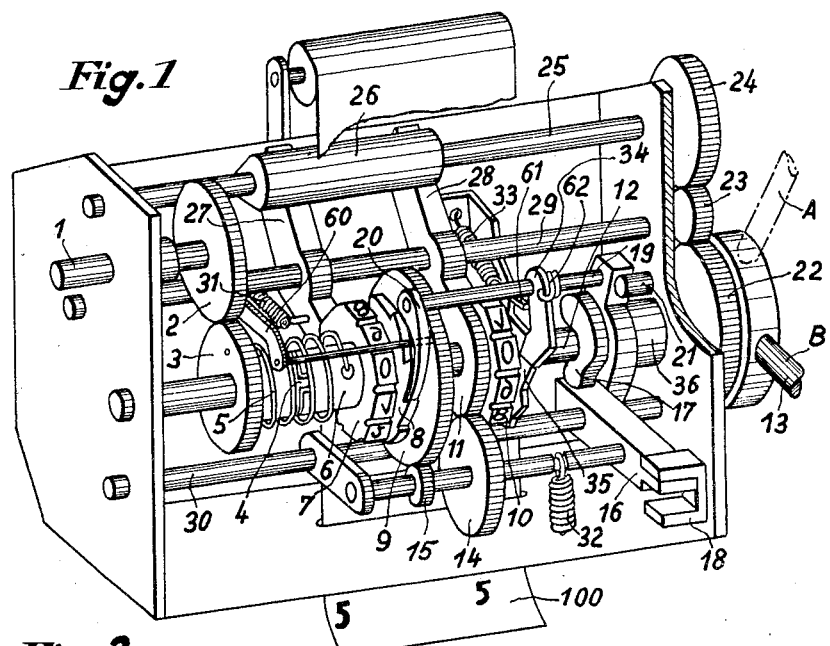
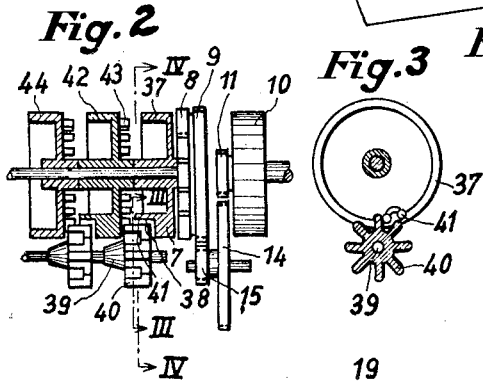
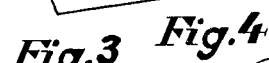
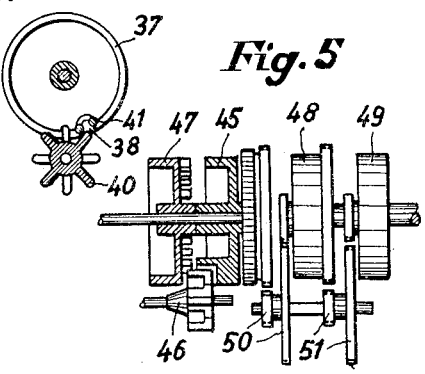
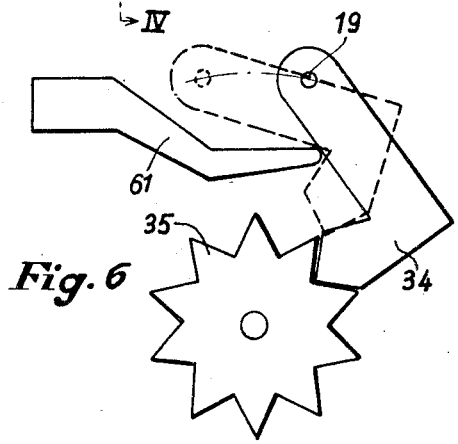
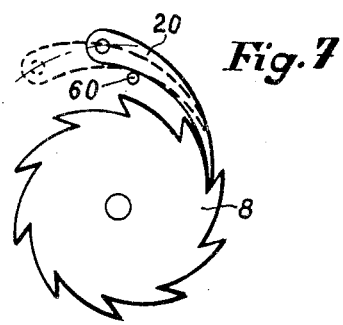

3,038,659
RAPID-ACTION COUNTER
Richard Unterberger, Munich, Bavaria, Germany, assignor to Carl Zeiss, Heidenheim (Brenz), Wurttemberg, Germany
Filed Dec. 26, 1958, Ser. No. 787,095
Claims priority, application Germany Oct. 30, 1952
7 Claims. (Cl. 235—117)

This application is a continuation in part of my copending application Ser. No. 387,254, filed October 20, 1953, now abandoned.

In counters such as those used for indicating the mileage of vehicles, it has so far been always the counting wheel of the lowest numeral order (hereinafter termed the ones wheel) which is driven from the measuring shaft, while the counting wheels of the higher orders (termed the tens, hundreds, etc., wheels) are, after each revolution of the preceding number wheel, advanced by one-tenth of their circumference by means of a geared drive. When such a counter is to be used where a given stretch composed of a large number of measurements must be passed over at relatively high speed, difficulties arise due to the excessive rate of revolution at which the ones wheel must rotate. A case in point are measuring machines where the entire stretch measured must often be traversed in a few seconds, and where, at a measuring accuracy of .01 mm. as the least unit, a large number of component measurements must be dealt with. In such cases, the time available for advancing the tens wheel and the wheels of the higher orders grows so small that it is no longer possible to insure dependable functioning.

It is an object of the present invention to show a way of circumventing these difficulties, in that the measuring motion to be transmitted is not given to the ones wheel, but directly to the tens wheel or a wheel of higher order at a correspondingly lower rate and that there is a reading member, such as a lever, key, or the like, which must be actuated before each reading to turn the driven wheel of higher order back to the next lower number and at the same time move the not driven wheels of lower decimal order ahead by the tenfold amount, so that all figures are lined up for reading. In this manner, the time available for advancing the number wheels of the higher orders is increased, and therewith the requisite dependability in operation secured.

It is a further object of the invention in counters coupled with a printing gear for recording the measured values, to combine the reading lever, which must be actuated at each reading anyway, and naturally also prior to each printing action, with the mechanism causing the printing, so that by actuating this one member, the driven wheel is not only set on a whole number and the wheels of lower decimal order are turned to correspond, but the result of measurement is recorded in print.

There are several ways of transmitting the motion of the driven wheel for instance tens wheel to the wheel of lower decimal order, for instance ones wheel, which ordinarily remains at rest. In a further object of the invention this means consists of intermediate wheels, especially gears of friction wheels, which ordinarily remain inactive and are caused to coact only upon actuation of the reading lever. When the counter is connected with the printing gear, it will of course be necessary also for the ones wheel to be set to a whole number at each actuation of the reading lever, so that all figures are in line. This can be achieved in different ways, e.g. by the well known expedient of a pawl, which when the reading lever is actuated, engages a ratchet gear and thereby sets the ones wheel to the nearest whole number.

The accompanying drawing shows one form of the object of the invention.

FIG. 1 shows a counter in perspective in which the measuring motion is transmitted to a tens wheel, FIG. 2 is a partial view of the counter of FIG. 1, but with the measuring range enlarged by the addition of a hundreds and a thousands wheel, FIG. 3 shows a section on the line III—III of FIG. 2, FIG. 4 is a section on line IV—IV of FIG. 2, FIG. 5 is another form of a counter according to FIG. 1, but in which the measuring motion is transmitted to a hundreds wheel, FIG. 6 shows a part of FIG. 1, FIG. 7 shows a part of FIG. 1.

In the counter of FIG. 1, the measuring motion is passed from shaft 1 over a gear 2 to a driving wheel 3. From there, the motion goes by way of an escape spring 5 blocked by a pin 4 to the tens wheel shaft 6 and tens wheel 7. For this purpose, pin 4 is so arranged in a recess of tens wheel shaft 6 that tens wheel 7 can be turned by any angle up to 36° relative to drive wheel 3. Attached to tens wheel 7 are a return ratchet wheel 8 with ten teeth, and a gear 9. A ones wheel 10 with a gear 11 is rotatably mounted on shaft 12. The gear 11 on the ones wheel, and the gear 9 of the tens wheel can be brought into rotation by way of a gear pair 14, 15.

The gears 15 and 9, as well as 14 and 11, are coupled by means of a lever 16 which, together with gears 14 and 15, rocks around a shaft 30, and whose motion in either direction is limited by a stop 18. A cam lobe 17 which is actuated through shaft 36 by reading lever 13, controls the meshing and unmeshing of the gear by means of lever 16. As soon as cam 17 is turned back by shaft 36, a tension spring 32 automatically unmeshes the gears. Turnably arranged on shaft 19 is a return pawl 20. Shaft 19 is connected with shaft 36 to rotate about this shaft in moving lever 13. Pawl 20 lays on a pin 60 as shown in FIG. 7 in dotted lines if lever 13 lies in position A. Pawl 20 falls in the teeth of ratchet wheel 8 if lever 13 is moved from A to B. This movement effects a turning back of the ratchet wheel 8. The magnitude of this motion is so limited by a stop pin 21 that when lever 13 is actuated, the return pawl 20 describes an arc of 36°. By lever 13 and through a geared transmission 22, 23, 24 there are further actuated a shaft 25 and cam lobe 26 seated thereon and charged with governing the printing means. This cam lobe presses the end of levers 27 and 28 against the wheels 7 and 10. Between the ends of levers 27 and 28 and the wheels 7 and 10 is arranged a paper 100 so that on this paper numbers of wheels 7 and 10 are printed. A spring 31 causes the levers 27 and 28 to be retracted into their initial position upon the return of the lobe 26.

In order to insure the requisite accurate setting of ones wheel 10 for printing, there is in addition provided a aligning mechanism which, after each rotation of the ones wheel, brings this wheel into a position where exactly one whole number appears in front of printing lever 28.

To this end a blade-shaped tooth 34 is provided turnably mounted on shaft 19 and laying on a slope 61. A spring 62 presses the tooth 34 against the teeth of a gear 35. If lever 13 moves from A to B, tooth 34 falls into the gear 35 and turns the gear into a printing position (FIG. 6). Ones wheel 10 is continually under the action of a spring 33, which returns the ones wheel to zero upon completion of the printing cycle.

The mode of action of the arrangement described is as follows:

Upon termination of the measuring motion, tens wheel 7 assumes a position corresponding to the number to be measured, say, "55." If the counter is arranged for reading, there appears under the reading window of the tens wheels, or if the mechanism is as shown in FIG. 1, i.e. arranged for printing, then in front of printing lever 27, the space between the figures "5" and "6."

When, now, reading lever 13 is shifted from the dotted-line position A into position B, cam 17 turns around shaft 12, and in this action causes lever 16 and therewith gears 14 and 15 to rock around shaft 30 and mesh with gears 11 and 9. At the same time, return pawl 20 turns around an axis parallel to shaft 12, and after a certain period of idling, which in the case of the number 55 assumed, corresponds to an angular rotation of 18°, comes upon the teeth of ratchet gear 8.

In its further rotation, return pawl 20 takes along gear 8 and turns it and tens wheel 7 by 18°. In front of printing lever 27, the figure "5" therefore now appears exactly. The rotation of tens wheel 7 is transferred through the meshing gears 9, 15, 14, and 11 to ones wheel 10 at ten times the ordinary rate, causing the ones wheel to turn by 180° in accordance with the example, so that the figure "5" of the ones wheel appears in front of printing lever 28.

Since the device shown in FIG. 1 is designed to print the measurements, the shift of lever 13 from position A to position B by way of gears 22, 23 and 24 on a shaft 25, causes cam 26 to turn so that it presses upon printing levers 27 and 28 and effects the printing action. Upon the return of lever 13 to the initial position A, cam 26 releases printing levers 27 and 28, which thereupon return to their initial position under the pull of spring 31. At the same time, cam 17 frees lever 16, allowing spring 32 to unmesh gears 9, 15 and 11, 14. Simultaneously, return pawl 20 and truing tooth 34 are disengaged whereupon spring 33 returns ones wheel 10 to zero.

FIGS. 2, 3 and 4 show the device of FIG. 1 with an extended measuring range. The measuring motion is transferred to tens wheel 7, and ones wheel 10 can be connected by way of gears 9, 15, 14, and 11 with the tens wheel for setting its value. Tens wheel 7, however, here has a cylindrical portion 37 with a notch 38, FIG. 4. A pinion 39 with eight teeth 40, of which each second tooth is shortened, causes two each non-shortened teeth to slide upon the periphery of the cylindrical portion 37 and to block the turning motion of pinion 39.

It is only when, after a revolution of tens wheel 7, a tooth 40 can enter the gap 38, that the blocking ceases. At the same moment, a tooth 41 on cylindrical portion 37 takes hold of one of the eight teeth of pinion 39, FIG. 3, and turns the pinion on by 90°. Thereupon blocking again occurs during a revolution of tens wheel 7. The rotation of the pinion is transferred to a hundreds wheel 42 provided with teeth 43 for the engagement of the teeth 40 of the pinion.

The number of the teeth 43 is such as to cause to correspond each quarter revolution of the pinion to one tenth revolution of hundreds wheel 42, i.e. at each complete revolution of tens wheel 7, hundreds wheel 42 is advanced by one unit. By a similar arrangement, the rotary motion of hundreds wheel 42 is transmitted to a thousands wheel 44. In this manner, the measuring range can be expanded upward by any amount.

FIG. 5 shows an altered form of the invention whereby the measuring motion is not, as hitherto discussed, transmitted to a tens wheel, but to a hundreds wheel 45. The turning motion of the hundreds wheel is transferred over a pinion 46 to a thousands wheel 47, as has already been described in connection with FIG. 2. Also with this design, the measuring range can be expanded upward by any amount. In order to allow reading the tens and ones numerals, a tens wheel 48 and a ones wheel 49 are provided, so that the necessary setting of tens wheel 48 takes place as described in connection with FIG. 1, in as much as hundreds wheel 45 and tens wheel 48 are connected by a gear 50, and the hundreds wheel is turned back. The ones wheel is set by means of a further corresponding gear 51. In this last design example, the measuring range can also be extended downward by any amount.

I claim:

1. In a rapid action counter for indication and registration of the number of measuring steps following each other in quick sequence, a continually revolving drive shaft having number wheels mounted thereon, one for each decimal, one of said number wheels having a higher numerical order than the number wheel of the lowest numerical order being connected with said revolving shaft and driven by said shaft, a spring coupling between said revolving shaft and said driven number wheel allowing a mutual rotation of said shaft with said driven number wheel, the number wheels giving the higher numerical order than the driven wheel being connected one with another with said driven wheel by gears advancing them by one-tenth of their circumference after each revolution of the preceding number wheel, a further shaft being independently arranged in the direction of an extension of the revolving shaft of said driven number wheel and on which the number wheel of lower order than said driven number wheel is rotatably mounted, the driven wheel and the wheel of lower numerical order than the driven wheel having ten teeth, aligning means engageable with said teeth and operable to turn said driven wheel against the urge of said spring coupling to a position wherein the last numeral to be displaced on the driven wheel is moved back to aligned position, said aligning means additionally operable to move said lower order wheel to aligned position, further means to disengage said means engaging said teeth of the driven number wheel and the wheel of lower numerical order, gear wheels being connected with the driven number wheel and the number wheel of lower numerical order, a further shaft being disposed parallel to said shaft of the driven number wheel and of said shaft on which the number wheel of lower numerical order than the driven wheel is rotatable, further gear wheels being connected by pairs rotatable on said parallel shaft meshing said gear wheels connected with said driven number wheel and said number wheel of lower numerical order and forming a gear coupling designed as a transmission of the ratio 1:10, means to engage and disengage said gear coupling, said last named means operable to cause said aligning means to engage said teeth to align said driven wheel upon engagement of said gear coupling.

2. In a rapid action counter for indication and registration of the number of measuring steps following each other in quick sequence, a continually revolving drive shaft having number wheels mounted thereon, one for each decimal, the tens-wheel being connected with said revolving shaft, a spring coupling between said revolving shaft and said tens-wheel allowing a mutual rotation of said shaft with said tens-wheel, the number wheels giving the higher numerical order than the tens-wheel being connected one with another and with the tens-wheel by gears advancing them by one-tenth of their circumference after each revolution of the preceding number wheel, a further shaft being independently arranged in the direction of an extension of the revolving shaft of the tens-wheel and on which the ones-wheel is rotatably mounted, the tens-wheel and the ones-wheel having ten teeth, means engageable with said teeth and operable to turn said tens-wheel against the urge of said spring coupling to a position wherein the last numeral to be placed on the tens-wheel is moved back to aligned position, said aligning means additionally operable to move said ones-wheel to aligned position, further means to disengage said means engaging said teeth of the tens-wheel and the ones-wheel, two gear-wheels, one of them being connected with the tens-wheel and the other of said two gear wheels being connected with the ones-wheel, a further shaft being displaced parallel to said shaft of the tens-wheel and of said shaft on which the ones-wheel is rotatable, further two gears being connected one with another rotatable on said parallel shaft meshing said gear wheels connected with the tens-wheel and with the ones-wheel forming a gear coupling designed as a transmission of the ratio 1:10, means to engage and disengage said gear coupling, said last named means operable to cause said aligning means to engage said teeth to align said tens-wheel upon engagement of said gear coupling.

3. In a rapid action counter for indication and registration of the number of measuring steps following each other in quick sequence driven by a continually revolving shaft having number wheels, one for each decimal, a recess being arranged in the tens-wheel and a pin being fixed to said revolving shaft and arranged in said recess, a spring connecting said shaft and said tens-wheel so that the wheel normally follows the shaft, one end of said spring being connected to said shaft and the other end being connected to said tens-wheel to turn the pin of the shaft against the one end of the recess and forming a spring coupling, said spring coupling allowing a mutual rotation of said shaft with said tens-wheel, gears connecting the tens-wheel and numeral wheels of higher order to advance each higher order wheel by one-tenth of its circumstance after each revolution of the preceding numeral wheel, a further shaft being independently arranged in the direction of an extension of the revolving shaft of the tens-wheel and on which the ones-wheel is rotatably mounted, the tens-wheel and the ones-wheel having ten teeth, means engageable with said teeth and operable to turn said tens-wheel against the urge of said spring coupling to a position wherein the last numeral to be placed on the tens-wheel is moved back to aligned position, said aligning means additionally operable to move said ones-wheel to aligned position, further means to disengage said means engaging said teeth of the tens-wheel and the ones-wheel, two gear wheels, one of them being connected with the tens-wheel and the other of said two gear wheels being connected with the ones-wheel, a further shaft being displaced parallel to said shaft of the tens-wheel and of said shaft on which the ones-wheel is rotatable, further two gears being connected one with another rotatable on said parallel shaft meshing said gear wheels connected with the tens-wheel and with the ones-wheel and forming a gear coupling designed as a transmission of the ratio 1:10, means to engage and disengage said gear coupling, said last named means operable to cause said aligning means to engage said teeth to align said tens-wheel upon engagement of said gear coupling.

4. In a rapid action counter for indication and registration of the number of measuring steps following each other in quick sequence, a continually revolving drive shaft having number wheels mounted thereon, one for each decimal, the tens-wheel being connected with said revolving shaft and said tens-wheel allowing a mutual rotation of said shaft with said tens-wheel, the number wheels giving the higher numerical order than the tens-wheel being connected one with another and with the tens-wheel by gears advancing them by one-tenth of their circumference after each revolution of the preceding number wheel, a further shaft being independently arranged in the direction of an extension of the revolving shaft of the tens-wheel and on which the ones-wheel is rotatably mounted, the tens-wheel and the ones-wheel having ten teeth, a further shaft being arranged parallel to the axis of the tens-wheel and the ones-wheel and being turnable around said axis, pawls being turnably arranged on said parallel shaft to fall in the teeth of the tens-wheel and the ones-wheel and operable to turn said tens-wheel against the urge of said spring coupling to a position wherein the last numeral to be placed on the tens-wheel is moved back to aligned position, said pawls additionally operable to move said ones-wheel to aligned position, a slope fixedly arranged to disengage the pawls and the teeth of the tens-wheel and the ones-wheel in turning the parallel shaft in the one direction and to engage the pawls with said teeth in turning the parallel shaft in the opposite direction, two gear wheels, one of them being connected with the tens-wheel and the other of said two gear wheels being connected with the ones-wheel, a further shaft being displaced parallel to said shaft of the tens-wheel and of said shaft on which the ones-wheel is rotatable, further two gears being connected one with another rotatable on said further parallel shaft meshing said gear wheels connected with the tens-wheel and with the ones-wheel and forming a gear coupling designed as a transmission of the ratio 1:10, means to engage and disengage said gear coupling, said last named means operable to cause said aligning means to engage said teeth to align said tens-wheel upon engagement of said gear coupling.

5. In a rapid action counter for indication and registration of the number of measuring steps following each other in quick sequence, a continually revolving drive shaft having number wheels mounted thereon, one for each decimal, the tens-wheel being connected with said revolving shaft, a spring coupling between said revolving shaft and said tens-wheel allowing a mutual rotation of said shaft with said tens-wheel, the number of wheels of higher numerical order than the tens-wheel being connected one with another and with the tens-wheel by gears advancing them by one-tenth of their circumference after each revolution of the preceding number wheel, a further shaft being independently arranged in the direction of an extension of the revolving shaft of the tens-wheel and on which the ones-wheel is rotatably mounted, the tens-wheel and the ones-wheel having ten teeth, a further shaft being arranged parallel to the axis of the tens-wheel and the ones-wheel and being turnable around said axis, pawls being turnably arranged on said parallel shaft to fall in the teeth of the tens-wheel and the ones-wheel and operable to turn said tens-wheel against the urge of said spring coupling to a position wherein the last numeral to be placed on the tens-wheel is moved back to aligned position, said pawls additionally operable to move said ones-wheel to aligned position, a slope fixedly arranged to disengage the pawls and the teeth of the tens-wheel and the ones-wheel in turning said parallel shaft in the one direction and to engage the pawls with said teeth in turning said parallel shaft in the opposite direction, a stop pin limiting the magnitude of the turning of said parallel shaft, a cam plate turnably arranged around the axis of said tens-wheel and said ones-wheel, said cam plate being fixedly connected with said parallel shaft carrying said pawls, two gear wheels, one of them being connected with the tens-wheel and the other of said two gear wheels being connected with the ones-wheel, a further shaft displaced parallel to said shaft of the tens-wheel and of said shaft on which the ones-wheel is rotatable, further two gears connected one with another rotatable on said further parallel shaft meshing said gear wheels connected with the tens-wheel and with the ones-wheel and forming a gear coupling being designed as a transmission of the ratio 1:10, means to engage and disengage said gear coupling, said last named means operable to cause said aligning means to engage said teeth to align said tens-wheel upon engagement of said gear coupling, a two-armed lever turnable around a fixed center, one arm of said lever sliding on said cam plate and the other arm carrying the additional shaft carrying the gears, said cam plate being formed so that at first said gears on said additional shaft engage said gear wheels, and then the pawls to turn the tens-wheel and the ones-wheel in the teeth of said tens-wheel and ones-wheel.

6. In a counter as in claim 5 a lever connected to said cam plate to rotate said cam plate.

7. In a counter as in claim 6 printing means actuated by said lever.

References Cited in the file of this patent
UNITED STATES PATENTS

| | | |
|---|---|---|
| 888,781 | Bowlus | May 26, 1908 |
| 2,073,162 | Malcher | Mar. 9, 1937 |
| 2,538,256 | Malcher | Jan. 16, 1951 |
| 2,558,631 | Suter | June 26, 1951 |
| 2,668,013 | Dawson | Feb. 2, 1954 |